(12) United States Patent
Dunn et al.

(10) Patent No.: US 8,562,770 B2
(45) Date of Patent: Oct. 22, 2013

(54) FRAME SEAL METHODS FOR LCD

(75) Inventors: William Dunn, Alpharetta, GA (US);
Michael LeCave, Gainesville, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 789 days.

(21) Appl. No.: 12/125,046

(22) Filed: May 21, 2008

(65) Prior Publication Data
US 2009/0288756 A1 Nov. 26, 2009

(51) Int. Cl.
*B32B 17/00* (2006.01)
*B29C 65/00* (2006.01)

(52) U.S. Cl.
USPC ............. 156/99; 156/297; 428/319.1; 349/58

(58) Field of Classification Search
USPC ........... 156/99, 107, 292, 297, 299, 108, 109, 156/305; 349/153, 155, 156, 190, 58, 59, 349/60; 428/1.5, 319.1
See application file for complete search history.

(56) References Cited

U.S. PATENT DOCUMENTS

| | | | | |
|---|---|---|---|---|
| 3,823,794 A | * | 7/1974 | Bre | 181/286 |
| 4,297,401 A | * | 10/1981 | Chern et al. | 428/1.53 |
| 4,640,584 A | * | 2/1987 | Tsubakimoto et al. | 349/153 |
| 4,691,995 A | * | 9/1987 | Yamazaki et al. | 349/189 |
| 4,712,875 A | * | 12/1987 | Tsuboyama et al. | 349/155 |
| 5,379,139 A | * | 1/1995 | Sato et al. | 349/155 |
| 5,547,483 A | * | 8/1996 | Garcia et al. | 65/42 |
| 5,610,742 A | * | 3/1997 | Hinata et al. | 349/122 |
| 5,937,611 A | | 8/1999 | Howes | |
| 6,555,235 B1 | * | 4/2003 | Aufderheide et al. | 428/447 |
| 6,650,393 B1 | * | 11/2003 | Nishiguchi | 349/156 |
| 7,924,362 B2 | * | 4/2011 | Slobodin | 349/58 |
| 2004/0155997 A1 | * | 8/2004 | West et al. | 349/86 |

FOREIGN PATENT DOCUMENTS

JP 62197335 A * 9/1987

* cited by examiner

*Primary Examiner* — John Goff
(74) *Attorney, Agent, or Firm* — Standley Law Group LLP

(57) ABSTRACT

A method for providing a bonded glass component for use in an LCD display. A frame is sealed to a glass component. A barrier coat is then applied to the sealant. An adhesive is poured over the entirety of the glass component and the frame. Starting at one edge of the glass component a second glass component is lowered down until an adhesive wave progresses across the glass component, until the second glass component in position.

19 Claims, 3 Drawing Sheets

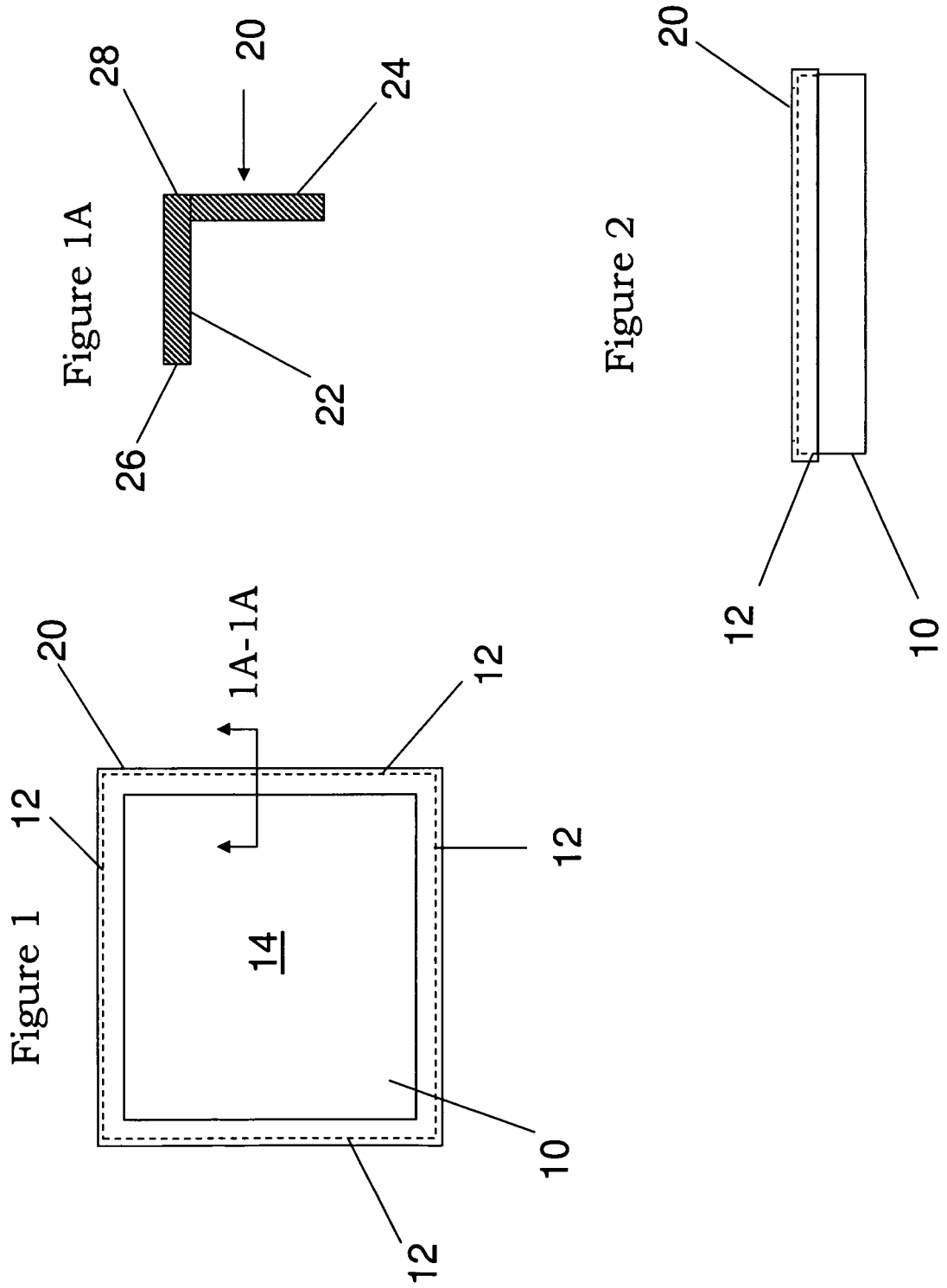

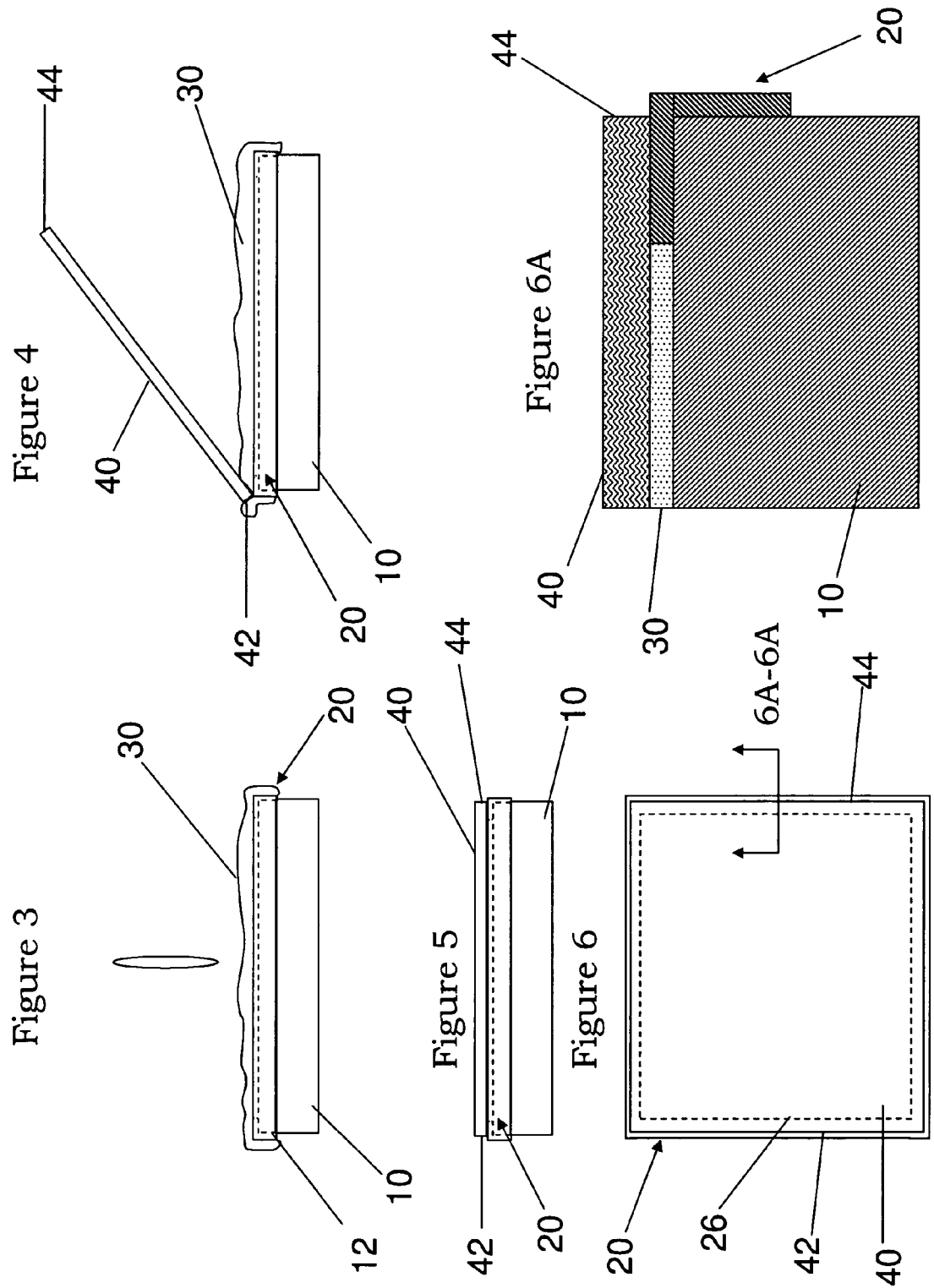

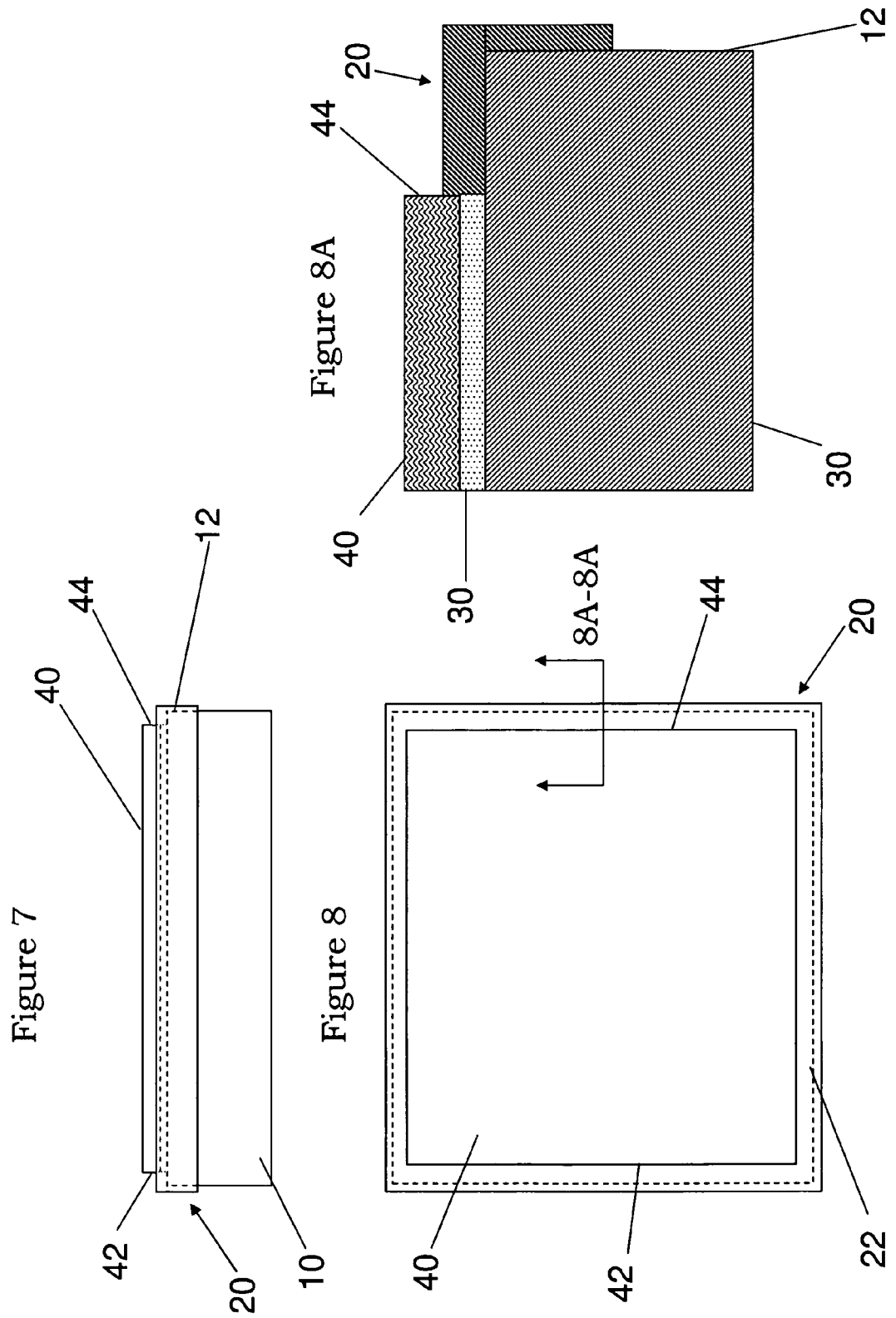

FRAME SEAL METHODS FOR LCD

TECHNICAL FIELD

The disclosed embodiments relate to a method for bonding glass components in the manufacturing of an LCD display. More particularly, the disclosed embodiments relate to a method of bonding glass components in the manufacturing of LCD displays such that the optical adhesive layer is free of imperfection and defects.

BACKGROUND AND SUMMARY OF THE INVENTION

In the manufacturing of LCD displays, it is necessary to bond glass components to one another. The bonded glass components may be used in the formation of LCD stack, glass front plates, or other glass features found in LCD displays. Generally, glass components are bonded using an optical adhesive interposed between the glass components. This bonding process is time consuming and subject to problems resulting in a display unfit for consumer use.

One such problem is the formation of air bubbles in the optical adhesive. As the optical adhesive is interposed between two glass components, the display is ruined. If air bubbles are formed the only options left to manufactures are either dispose of the ruined bonded glass components, or spend a large amount of time manually removing the optical adhesive from the glass components. This problem is only magnified as the size of LCD displays increase necessitating the need for larger more expensive glass components.

Another problem that occurs during the bonding process is known as the halo effect or window framing. The halo effect may be caused by using an insufficient amount of optical adhesive to maintain glass component coverage during the curing phase. As the optical adhesive cures and experience shrinking, the optical adhesive may pull away from the edges of the bonded glass components again ruining the bonded glass components and rendering the display unfit for consumer use.

Mechanical separation may also be a problem if the optical adhesive is not in sufficient amounts at the edges of the glass components. A lack of bonding material at the edge of the glass components may cause the bonded glass components to begin to separate ruining the display. This problem occurs in application such as laptops where the lid containing the LCD display is opened and closed regularly.

Another problem that may be a result of the bonding process is the formation of voids starting at the edge of the glass components. The voids develop over time through expansion and contraction cycles. The formation of voids may be accelerated in LCD displays used outdoors or other locations experiencing large temperature variations. Again as with the other possible defects listed above, the voids ruin a display.

These and other problems may be avoided by the method described and shown herein. In one exemplary embodiment of bonding glass components, a first glass component having a frame is provided, the frame being in contact with the first glass component. A sealant is used to seal the edge of the frame and the first glass component. This sealant is allowed to cure. A barrier coat is applied over the sealant. The barrier coat is allowed to cure. An adhesive is poured over the entirety on the first glass component and frame. A second glass component is placed on the frame with one end still elevated over the first glass component. The second glass component is slowly lowered till the previously elevated edge rests on the frame, resulting in an adhesive layer interposed between the second glass layer and the first glass layer and the frame.

In another exemplary embodiment, the barrier coat step is removed and the adhesive is poured directly onto the first glass component, sealant, and the frame. In still another exemplary embodiment, an edge of the second glass component is placed at the intersection of the first glass component and the frame, still having an edge elevated above the first glass component. The second glass component is slowly lowered till the previously elevated edge rests at the intersection of the first glass component and the frame, resulting in an adhesive layer interposed between the second glass layer and the first glass layer.

BRIEF DESCRIPTION OF THE DRAWING(S)

A better understanding of the disclosed embodiments will be obtained from a reading of the following detailed description and the accompanying drawings wherein identical reference characters refer to identical parts and in which:

FIG. 1 is a top view of an exemplary embodiment of a glass component having a frame.

FIG. 1A is a cross-sectional view of an embodiment of the frame in FIG. 1 taken along line 1A-1A as indicated in FIG. 1.

FIG. 2 is a side view of an exemplary embodiment of a glass component having a frame.

FIG. 3 is a side view of an exemplary embodiment of a glass component coated with adhesive.

FIG. 4 is a side view of an exemplary embodiment of a first and second glass component.

FIG. 5 is a side view of an exemplary embodiment of a bonded glass product.

FIG. 6 is a top view of an exemplary embodiment of a bonded glass product.

FIG. 6A is a magnified cross-sectional view of an embodiment of a bonded glass product in FIG. 6 taken along line 6A-6A as indicated in FIG. 6.

FIG. 7 is a side view of an exemplary embodiment of a bonded glass product.

FIG. 8 is a top view of an exemplary embodiment of a bonded glass product.

FIG. 8A is a magnified cross-sectional view of an embodiment of a bonded glass product in FIG. 8 taken along line 8A-8A as indicated in FIG. 8.

DETAILED DESCRIPTION OF EXAMPLARY EMBODIMENT(S)

FIG. 1 is an elevated top view of a first glass component 10 having defined outside edges 12. The first glass component may have a first surface 14. The first glass component may have a frame 20 positioned around the outside edges 12. FIG. 1A is a cross-sectional view of the frame 20. The frame 20 may have an L-shaped cross section having a top portion 22 and a side portion 24. The top portion 22 of the frame 20 having an inside edge 26 and an outside edge 28. The top portion 22 of the frame 20 is designed to overlap the first surface 14 of the first glass component 10, such that the outside edges 12 of the first glass component 10 contact the side portion 24 of the frame 20, as illustrated in FIG. 2. The frame 20 may be a rigid material, including, but not limited to, metal. The frame 20 may have a unitary body design. In other embodiments, the frame 20 may be constructed from multiple sections.

In exemplary embodiments, the first glass component 10 may be a LCD stack. In other embodiments, the first glass component 10 may be a front plate, such as described in co-pending U.S. Application No. 61/033,064, incorporated by reference as if fully rewritten herein. In still other embodiments, the first glass component 10 may be any glass feature found in a LCD display.

To begin the bonding process an adhesive is applied to edge 26 of the frame 20 overlapping the first glass component 10 on its first surface 12, forming a frame seal. The width and thickness of the frame seal may be sufficient to form a complete seal between the edge 26 of the frame 20 and the first surface 14 of the first glass component 10. This frame seal may prevent particulate from entering any space between the top portion 22 of the frame 20 and the first surface 14 of the first glass component 10. The adhesive may then be allowed to cure at room temperature. A variety of adhesives may be used to seal the frame 20 to the first surface 12. One example of an adhesive that may be used is Dow Corning® brand product 3145 RTV Adhesive/Sealant (hereinafter "the 3145 adhesive").

After the adhesive has had sufficient time to cure, a barrier coat may be applied over the frame seal. The barrier coat may be applied over the frame seal with a brush. In other exemplary embodiments, the barrier coat may be applied using any suitable application method. The adhesive used may be an optical adhesive. In other embodiments, the optical adhesive may be index matched. One example of an adhesive that may be used is Dow Corning® brand Product, Sylgard® 527 A&B Silicone Dielectric Gel (hereinafter "the 527 adhesive"). The 527 adhesive may comprise 1 part resin to 3 parts catalyst. However, to maximize adhesion and optical performance, the 527 adhesive may comprise 1 part resin to 1 part catalyst. After the barrier coat is applied, it is allowed to cure at room temperature.

After the barrier coat has had sufficient time to cure, skirting tape (not shown in the figures) may be applied to the side portion 24 of the frame 20. The skirting tape may be aligned such that is covers the side portion 24 of the frame 20 without contacting the top portion 24 of the frame 20. The skirting tape may be any self adhesive tape. More preferably, the skirting tape may be any self adhesive tape that is easily removable. In other exemplary embodiments, a skirting tape may not be used.

The next step in the bonding process is to apply an adhesive 30 over the entire first surface 14 of the first glass component 10 and frame 20, as illustrated in FIG. 3. The adhesive 30 may be poured so as to flood the entire first surface 14 of the first glass component 10 and cover the frame 20. The adhesive 30 may continue to be poured over the first surface 14 of the first glass component 10 and frame 20 until the adhesive 30 runs over the top portion 22 of the frame 20 and down the side portion 24. Any excess adhesive may be recovered from underneath the first glass component 10. In some embodiments, the adhesive 30 may be poured from above at approximately the center of the first surface 14. In other embodiments, the adhesive 30 may be poured from multiple positions above the first surface 14 or frame 20. The adhesive 30 used may be an optical adhesive. In other exemplary embodiments, the adhesive 30 may be index matched. One example of an adhesive 30 that may be used is Dow Corning® brand Product, Sylgard® 527 A&B Silicone Dielectric Gel (hereinafter "the 527 adhesive"). The 527 adhesive may comprise 1 part resin to 3 parts catalyst. However, to maximize adhesion and optical performance, the 527 adhesive may comprise 1 part resin to 1 part catalyst.

In other embodiments, the 527 adhesive may be replaced by photo initiated optical adhesives manufactured by Momentive Performance Materials, Incorporated (hereinafter "Momentive"). By using optical initiated optical adhesives manufactured by Momentive, some chemical incompatibilities associated with the use of the 527 adhesive may be eliminated. By eliminating the chemical incompatibilities associated with the 527 adhesive a portion of the bubble formation may also be eliminated. The use of Momentive's optical initiated adhesives may also decrease the curing times, thus increasing production times.

After the adhesive 30 has been allowed to flood the first surface 14 a second glass component 40, having a first edge 42 and a second edge 44, may be positioned for bonding. In exemplary embodiments, the second glass component 40 may be a LCD stack. In other embodiments, the second glass component 40 may be a front plate. In still other embodiments, the second glass component 40 may be any glass feature found in a LCD display.

The second glass component 40 may be positioned so that the first edge 42 is in contact with the corner formed by the intersection of the top portion 22 and side portion 24 of the frame 20. The second edge 44 may be elevated above the first surface 14 of the first glass component 10, as illustrated in FIG. 4. The second edge 44 may then be slowly lowered so as to create a wave of adhesive 30. As the second edge 44 of the second glass component 40 is lowered, the adhesive 30 wave moves across the first surface 14. By lowering the second glass component 40 in this manner, the defects associated with bonded glass components may be eliminated. After the second edge 44 of the second glass component 40 is lowered such that the second edge 44 contacts the frame 20, and is substantially parallel to the first glass component 10, it is allowed to cure at room temperature. After curing is complete the skirting tape is removed, thus removing any excess adhesive 30 from the frame 20.

The finished product is illustrated in FIGS. 5, 6, and 6A. FIG. 5 is a side view of the of the bonded glass components 10 and 40. In the embodiment shown, the perimeters of the first glass component 10 and the second glass component 40 are substantially equal. FIG. 6 is a top perspective view of the bonded glass. FIG. 6A is a magnified cross-sectional view of the bonded glass. The second glass component 40 may be in contact with the top portion 22 of the frame 20. A layer of adhesive 30 is interposed between the second glass components 40 and the first glass component 10 and the frame 20. The depth of the adhesive 30 may be substantially equal to that of the thickness of the top portion 22 of the frame 20. In this manner, the depth of the adhesive 30 may be controlled by varying the thickness of the top portion 22 of the frame 20.

In other embodiments, the second glass component 40 may have perimeter dimensions less than that of the first glass component 10. This is illustrated in FIG. 7. To bond the second glass component 40 to the first glass component 10 the first edge 42 of the second glass component 40 is positioned at the intersection of the top portion 22 of the frame 20 and the first surface 14 of the first glass component 10. The second edge 44 is elevated above the first surface 14 of the first glass component 10. The second edge 44 is slowly lowered so as to create a wave of adhesive 30. As the second edge 44 of lowered, the adhesive 30 wave moves across the first surface 14. The second edge 44 is lowered so that it may nestle in the intersection of the top portion 22 of the frame 20 and the first surface 14. FIG. 8 provides a top view of the bonded glass. FIG. 8A is a cross-sectional view of the bonded glass. In this embodiment, the second glass component 40 rests on the adhesive 30 layer rather than the frame 20 as in the embodiment illustrated in FIG. 6A.

In other exemplary embodiments, the skirting tape may be applied to both the top and side portions 22 and 24 of the frame 20. This allows for the removal of any excess adhesive 30 from the all portions of the frame 20.

In still other embodiments, the 3145 adhesive used for the frame seal is replaced by an adhesive having a lower viscosity. One example of an adhesive that may be used is Dow Corning® brand product 3140 RTV Adhesive/Sealant (hereinafter "the 3145 adhesive"). The use of an adhesive having a lower viscosity than that of the 3145 adhesive may eliminate the need for a barrier coat. In exemplary embodiments, where the barrier is no longer applied, the adhesive 30 may be poured onto the first surface 14 after the frame seal is cured.

Some embodiments of the present invention may involve displays other than LCD displays. An example would be plasma display or rear-projection television. An exemplary embodiment may be used with any type of display where bonded glass components may be used.

Having shown and described exemplary embodiments of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A method of bonding glass components, comprising:
providing a first glass component having a first surface and a perimeter;
providing a frame having a top portion which continuously overlaps the perimeter of the first surface of the first glass component;
sealing the first glass component and the frame with a sealant;
allowing the sealant to cure;
applying a barrier coat over the sealant;
allowing the barrier coat to cure;
pouring an adhesive over the first surface of the first glass component and the top portion of the frame;
placing a second glass component, having a first and second edge, such that the first edge is in contact with the top portion of the frame and the second edge is elevated above the first glass component; and
lowering the second edge of the second glass component till the second glass component is substantially parallel with first glass component.

2. The method of claim 1 further comprising:
applying a skirting tape around the frame prior to pouring the adhesive.

3. The method of claim 2 further comprising:
removing the skirting tape from the frame.

4. The method of claim 1 wherein the sealant is applied with a brush.

5. The method of claim 1 wherein the adhesive is interposed between the second glass component and the first glass component and the frame.

6. The method of claim 1 wherein the first glass component is an LCD display.

7. The method of claim 1 wherein the first glass component is a glass plate.

8. A method of bonding glass components, comprising:
providing a first glass component having a first surface and a perimeter;
providing a frame having a top portion which continuously overlaps the perimeter of the first surface of the first glass component;
sealing the first glass component and the frame with a sealant;
allowing the sealant to cure;
pouring an adhesive over the first surface of the first glass component and the top portion of the frame;
placing a second glass component, having a first and second edge, such that the first edge is in contact with the top portion of the frame and the second edge is elevated above the first glass component; and
lowering the second edge of the second glass component till the second glass component is substantially parallel with first glass component.

9. The method of claim 8 further comprising:
applying a skirting tape around the frame prior to pouring the adhesive.

10. The method of claim 9 further comprising:
removing the skirting tape from the frame.

11. The method of claim 8 wherein the sealant is applied with a brush.

12. The method of claim 8 wherein the adhesive is interposed between the second glass component and the first glass component and the frame.

13. The method of claim 8 wherein the first glass component is an LCD display.

14. The method of claim 8 wherein the first glass component is a glass plate.

15. A method of bonding glass components, comprising:
providing a first glass component having a first surface and a perimeter;
providing a frame having a top portion which overlaps the perimeter of the first surface of the first glass component;
sealing the first glass component and the frame with a sealant;
allowing the sealant to cure;
applying a barrier coat over the sealant;
allowing the barrier coat to cure;
pouring an adhesive over the first surface of the first glass component and the top portion of the frame;
placing a second glass component, having a first and second edge, such that the first edge rests atop the adhesive at the intersection of the first surface and the top portion of the frame and the second edge is elevated above the first glass component; and
lowering the second edge of the second glass component until the second glass component is substantially parallel with the first glass component and within the top portion of the frame.

16. The method of claim 15 wherein the sealant is applied with a brush.

17. The method of claim 15 wherein the adhesive is interposed between the second glass component and the first glass component and the frame.

18. The method of claim 15 wherein the first glass component is an LCD display.

19. The method of claim 15 wherein the first glass component is a glass plate.

* * * * *